US011199452B2

(12) United States Patent
Lerch et al.

(10) Patent No.: US 11,199,452 B2
(45) Date of Patent: Dec. 14, 2021

(54) PROCESS FOR DETERMINING A TOOTH COLOR

(71) Applicant: Ivoclar Vivadent AG, Schaan (LI)

(72) Inventors: Stefan Lerch, Bern (CH); José Antonio Pulido Estepa, Widnau (CH)

(73) Assignee: Ivoclar Vivadent AG, Schaan (LI)

( * ) Notice: Subject to any disclaimer, the term of this patent is extended or adjusted under 35 U.S.C. 154(b) by 23 days.

(21) Appl. No.: 16/594,232

(22) Filed: Oct. 7, 2019

(65) Prior Publication Data

US 2020/0132550 A1 Apr. 30, 2020

(30) Foreign Application Priority Data

Oct. 25, 2018 (EP) .................................... 18202675

(51) Int. Cl.
| | | |
|---|---|---|
| *G01J 3/46* | (2006.01) | |
| *G01J 3/50* | (2006.01) | |
| *G01J 3/52* | (2006.01) | |

(52) U.S. Cl.
CPC ............... *G01J 3/508* (2013.01); *G01J 3/463* (2013.01); *G01J 3/52* (2013.01)

(58) Field of Classification Search
CPC .. G01J 3/508; G01J 3/463; G01J 3/52; G09G 5/02; G06T 11/001; A61C 2201/00; A61C 2201/002; A61C 5/00; A61C 19/10
See application file for complete search history.

(56) References Cited

U.S. PATENT DOCUMENTS

| | | | |
|---|---|---|---|
| 5,023,814 A | 6/1991 | Guillemin | |
| 5,907,495 A | 5/1999 | Snyder et al. | |
| 6,719,452 B2 | 4/2004 | Schermacher et al. | |
| 7,536,231 B2 | 5/2009 | McClanahan et al. | |
| 7,808,508 B2 | 10/2010 | Krumbholz | |
| 8,666,540 B2 | 3/2014 | Milhorn | |
| 9,924,778 B2 | 3/2018 | Balooch et al. | |
| 10,010,387 B2* | 7/2018 | Esbech | G01J 3/508 |
| 10,049,398 B2 | 8/2018 | Somerville et al. | |
| 2010/0232688 A1* | 9/2010 | Komiya | G01J 3/463 |
| | | | 382/162 |

(Continued)

FOREIGN PATENT DOCUMENTS

| | | |
|---|---|---|
| DE | 102006049743 A1 | 1/2008 |
| DE | 102009023952 A1 | 12/2010 |
| WO | 9313398 A1 | 7/1993 |

*Primary Examiner* — Antonio A Caschera
(74) *Attorney, Agent, or Firm* — Ann M. Knab; Thad McMurray

(57) ABSTRACT

A process for determining a tooth color of a filling or another restoration is provided which in particular is produced using composite materials, wherein at least one tooth is scanned or is visually detected. The process is characterized in that natural teeth are spectrally measured in advance, that the color values measured within a color space are classified into several, in particular four, categories which each form a color cloud extending in a three-dimensional fashion within the color space, which is done with the help of a structuring algorithm, in particular a Nearest Neighbour Algorithm, or a symmetry recognition algorithm, and that the tooth color of the filling is determined by means of evaluating to which category the tooth scanned has the smallest color distance, or to which color cloud the tooth scanned belongs.

23 Claims, 16 Drawing Sheets

(56) References Cited

U.S. PATENT DOCUMENTS

| | | | |
|---|---|---|---|
| 2011/0188086 A1* | 8/2011 | Lehmann | G01J 3/462 |
| | | | 358/1.18 |
| 2012/0099788 A1* | 4/2012 | Bhatti | G01J 3/462 |
| | | | 382/167 |
| 2013/0244197 A1* | 9/2013 | Tjioe | G01J 3/0264 |
| | | | 433/29 |

* cited by examiner

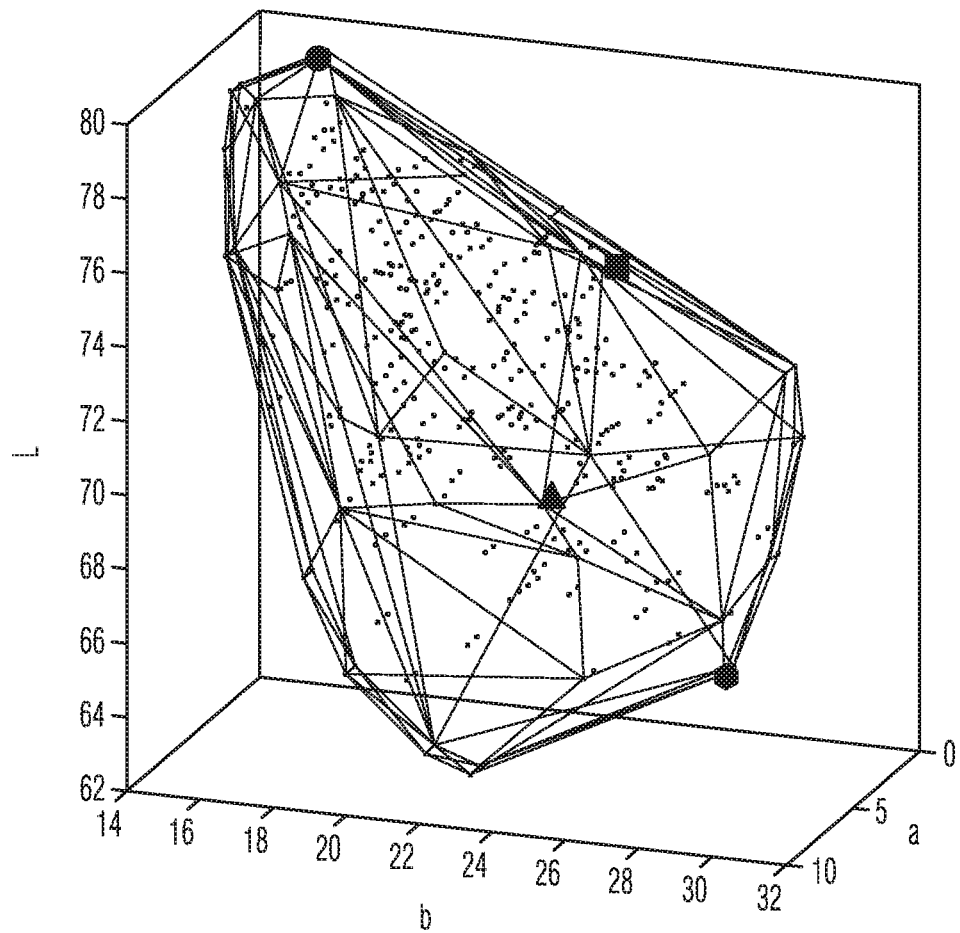
Fig. 7
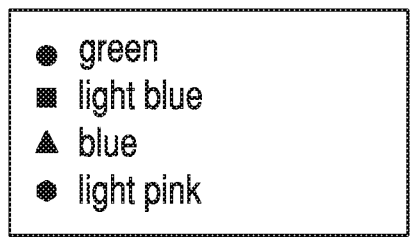

PROCESS FOR DETERMINING A TOOTH COLOR

CROSS-REFERENCE TO RELATED APPLICATIONS

This application claims priority to European Patent Application No. 18202675.7 filed on Oct. 25, 2018, the disclosure of which is incorporated herein by reference in its entirety.

TECHNICAL FIELD

The invention concerns a process for determining a tooth color.

BACKGROUND

What is referred to as shade guides or shade, or color rings, has been used for selecting tooth colors for a long time. These are frequently pre-classified, such that several color values are summarized, for example in shades of white, shades of red, shades of yellow, and shades of grey.

In many cases, use is made of what is referred to as the Vita shade guide, ranging from A1 to A4, B1, etc., and D4.

For determining a tooth color of a dental restoration, the dentist now selects the closest color value by holding the tooth guide to the proximity of the dental restoration, for instance to the neighbouring tooth, and visually compares which tooth color is the one to fit best.

The dentist makes a mental note of the tooth color thus determined and prepares a dental restoration made out of the corresponding material which, in turn, is designated with the same tooth color.

Instead of ceramic dental restorations, composite materials are often used currently due to their good processability and, in part, also very good translucency. These are easily applied in the mouth as well, and then curable by means of light and/or heat.

On the other hand, such filling materials have limited shelf lives. Nevertheless, the dentist keeps in stock all filling materials, of course, although he may use the D4 material, for example, once every 10 years.

After expiration of its shelf life, the material in question must thus be disposed of unused and be newly acquired, an unparalleled waste.

This process has so far been used for any type of dental restoration, which is, for instance, crowns, bridges, inlays, onlays, fillings, veneers, prefacettes, root canal fillings, temporary restorations, complete dentures, partial dentures, and further dental restorations.

In some cases, different dental restorations also require different materials, which double or triple the number of materials that have to be stored and which place a strain on storage and thus potential waste.

In addition, different materials may be preferred depending on the application. A distinction must be made here between composites on the one hand and ceramics on the other.

Within the field of composite materials, there are, in addition, various materials which differ both with respect to their translucency and with respect to their hardness.

In the case of ceramics, a distinction has to be made between lithium disilicate ceramics and zirconium oxide ceramics, whereby lithium disilicate ceramics can be processed very well as metasilicate and still show practically no shrinkage, while zirconium oxide ceramics are harder.

In addition, glass ionomer cement is used as well.

Overall, the number of dental materials to be stored is at an exponential amount, possibly amounting to hundreds of materials in storage.

SUMMARY

In contrast to this, the invention is based on the task of creating a process according to the claims, which makes it possible to improve stock-keeping at least with a part of the materials to be used without any need to fear reductions in the physical/technical or optical quality of the dental restorations.

This task is solved, in accordance with the invention, by the claims. Advantageous further embodiments result from the subordinate claims.

U.S. Pat. Nos. 5,023,814, 8,666,540, 6,719,452, 5,907,495, U.S. Ser. No. 10/049,398, U.S. Pat. Nos. 7,536,231, and 7,808,508, directed to coloring of materials, are hereby incorporated by reference.

In accordance with the invention, a particular process for determining a tooth color is used. In this process, special tooth colors are employed, as explained in detail below, which are particularly suitable for fillings, inlays, and onlays, and are drastically reduced in their numbers.

Surprisingly, stock-keeping may still be optimised, although special materials are used here, such that one would actually assume that additional expenditure would be necessary.

These materials, however, are in a position to entirely replace those materials previously used for fillings, inlays, and onlays, such that, for example, only four rather than 16 materials may be used without any reduction in quality. The filling materials which will then have to be stored in only four tooth colors may be provided to be comparatively yielding and flexible and, in particular, safely exhibit low shrinkage, since, for instance, shrinkage has a considerably higher relevance with fillings compared to crowns.

Surprisingly, furthermore, "discards" or scrap may be eliminated almost completely. The colors are determined in accordance with a particular process, which is described below, in such a fashion that no color is used particularly rarely; on the contrary, all colors are used uniformly in practice.

Thus there is no more scrap, and the reordering of tooth colors may be optimised in such a fashion that the stock is exhausted by the end of its shelf life.

In accordance with the invention, a multitude of natural teeth should be spectrally measured with a spectrophotometer or similar device for measuring shade and color, in a preliminary process. The spectroscopic measurement may be performed on, for example, 300, 500, or even 1000 individual natural teeth. The color values of all measured teeth will then lie within a color space, for instance, the Lab (also known as CIE L*a*b*) color space. In a special inventive procedure, the color values are then divided into several color clouds, which can be any number, such as, but not limited to, 3 to 6, and preferably 4, color clouds extending in three dimensions and corresponding to categories.

The division is made in such a way that the color clouds have essentially equal volumes or the same volume, or, more precisely, that they comprise essentially equal numbers of uniformly distributed color value points of the teeth measured.

Each color cloud is basically convex and extends in three dimensions within the color space.

According to an advantageous embodiment, an auxilliary structure, such as a grid or mesh, made up of uniformly distributed points is placed over the color space. Based on initial categories, evaluating which initial category is closest to some O point or initial point, category boundaries are determined as surfaces extending in a three-dimensional fashion. Then again, the above evaluation is made, and category boundaries between individual categories are iteratively determined as surfaces extending in a three-dimensional fashion.

The determination may be done with the help of any structuring algorithm. One example is the K Nearest Neighbour Algorithm, which iteratively determines a classification until the iteration is stopped at a pre-determined threshold value of entropy.

With the help of this preliminary or advance procedure, it can now be determined which tooth color will be best suited for the filling; in this example, in total, there are provided four filling tooth colors which respectively correspond to the color clouds.

When determining the relevant four colors, care is taken to ensure that the maximum possible color error Delta E is not greater than a certain or specified value. This can, for example be set to Delta E=5.0, 5.5, 6.0, or 6.5.

Although such color distance is clearly visible upon closer inspection, it is readily acceptable with fillings of higher transparency. This is due, in particular, to the comparatively low degree of opacity of the composite material and what is referred to as the chameleon effect, which significantly reduces the shade error.

Distal fillings as well as occlusal fillings in the upper jaw are practically irrelevant as far as color is concerned.

In accordance with the invention, one of the four target colors is now selected for the filling, either manually or by comparing the scan with the electronically available target color.

This determination of the target color may be done in a basically known fashion, for example, or also in accordance with the Least Square Fit Algorithm, as is described in DE 10 2009 023 952 A1.

In an advantageous embodiment of the process in accordance with the invention, a convex envelope or large cloud should first be arranged around any color values of the natural teeth determined and measured. This extends within the color space in three dimensions and in an asymmetrical/elongated fashion, with a rather large maximum color distance of, for example, delta E=40.

Based on this database, a uniformly distributed grid of auxiliary points is now placed into the color space, and the auxiliary points outside the envelope are arithmetically eliminated.

Now, for example, four points are used as starting points, each for one category, wherein each point is assigned to one category.

For each auxiliary point, it is determined to which category it is closest, and the auxiliary point in question is given the associated category color.

Now, entropy is calculated for each point, corresponding to the probability that a point belongs to a certain category.

Herein, a small or low entropy value corresponds to a bad distribution, and a high entropy value to a good distribution.

For the best category and for the worst category, the initial point is now changed to a random new point, in particular a neighbouring point.

Then, the process is repeated after the initial point, i.e. it is checked once more for each auxiliary point to which category it is closest.

The process is carried out iteratively until the added-up value of entropy exceeds a threshold value.

Alternatively to this final condition, it may also be checked when the worst value of entropy will exceed a threshold value.

Filling materials are now provided in the four target colors determined in this way. These have a slightly lower opacity, corresponding to a slightly higher translucency, than standard colors.

This surprisingly succeeds in creating an aesthetically very satisfying system for the preparation of filling-like dental restorations that is far more efficient in terms of storage.

BRIEF DESCRIPTION OF THE DRAWINGS

Further advantages, details, and features result from the subsequent description of an exemplary embodiment of the invention with the help of the drawings, wherein:

FIG. 7 shows a depiction of selected points of the color space belonging to step 4 of the exemplary calculation;

DETAILED DESCRIPTION

Figure 1A:
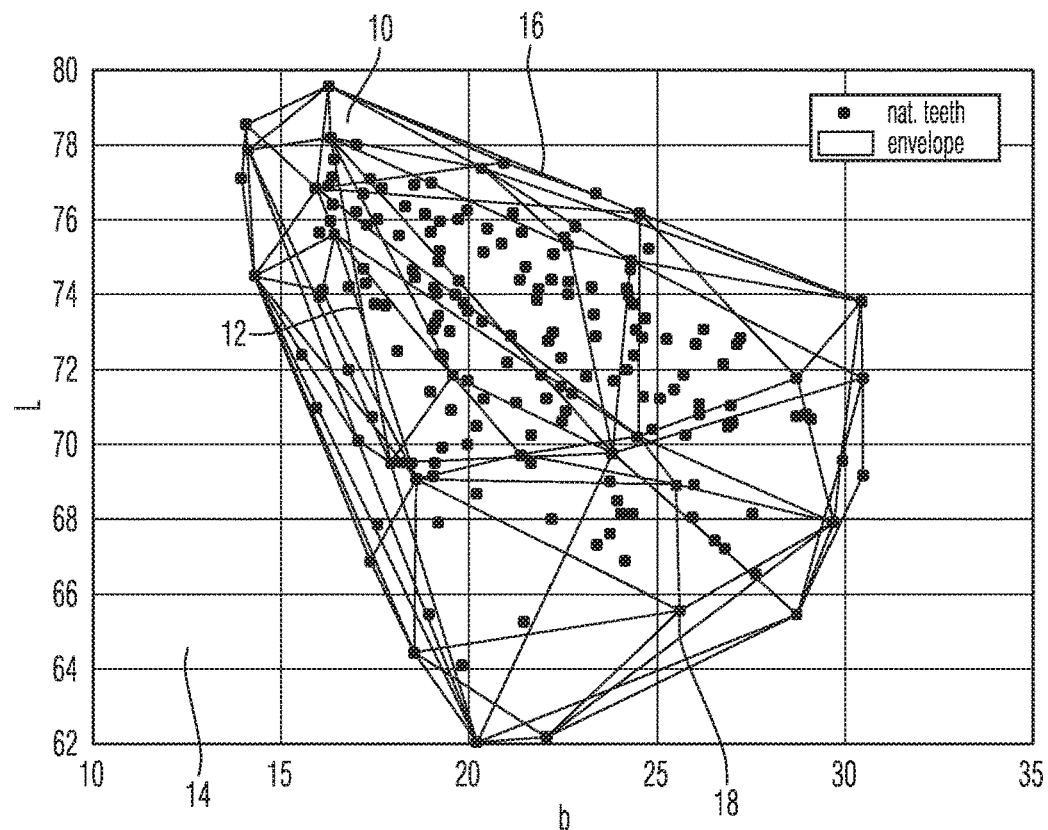
FIG. 1a shows a two-dimensional depiction of the color values of the natural teeth measured, within a three-dimensional color space, as well as the envelope around the points.

From FIG. 1a, a cloud 10 of points 12 inside a Lab color space 14 is visible. The two-dimensional distribution is plotted over L and b in FIG. 1a. In addition, an enveloping envelope 16 is provided which extends along each of the outermost points 12 and within which thus all points 12 extend.

Figure 1B:
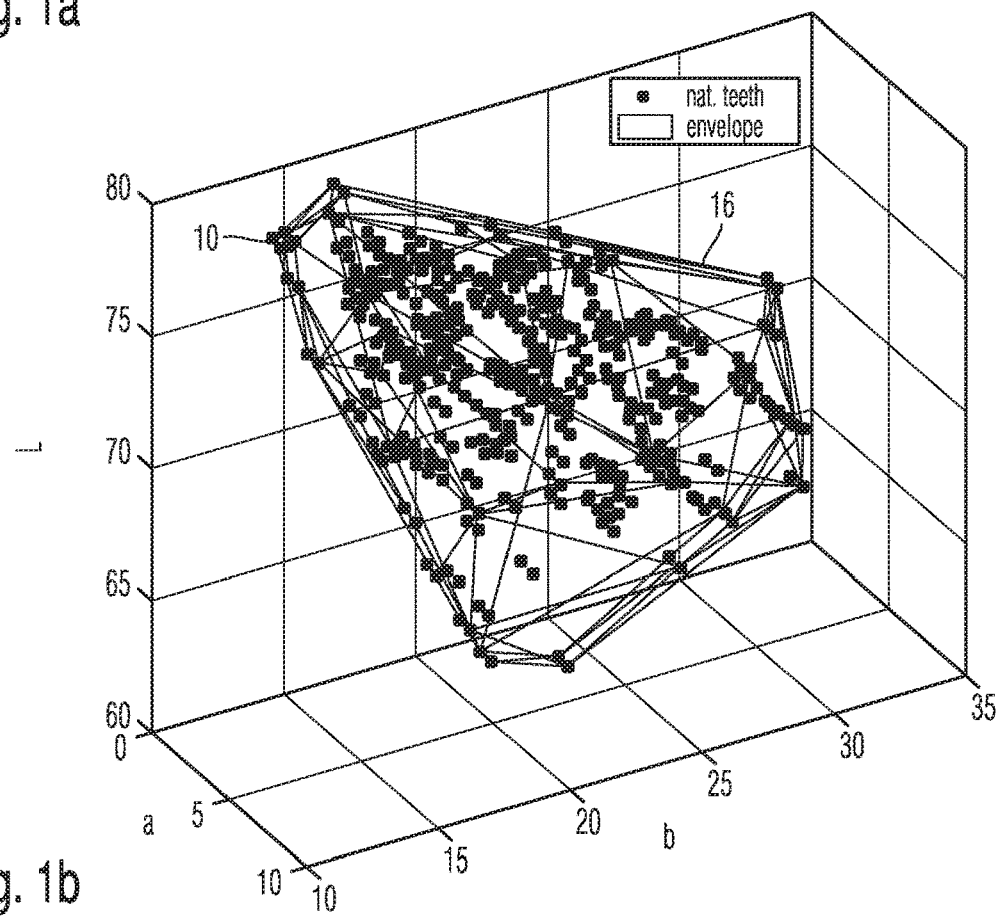
FIG. 1b shows a two-dimensional depiction of the color values of the natural teeth measured, within a three-dimensional color space, as well as the envelope around the points.
Figure 1C:
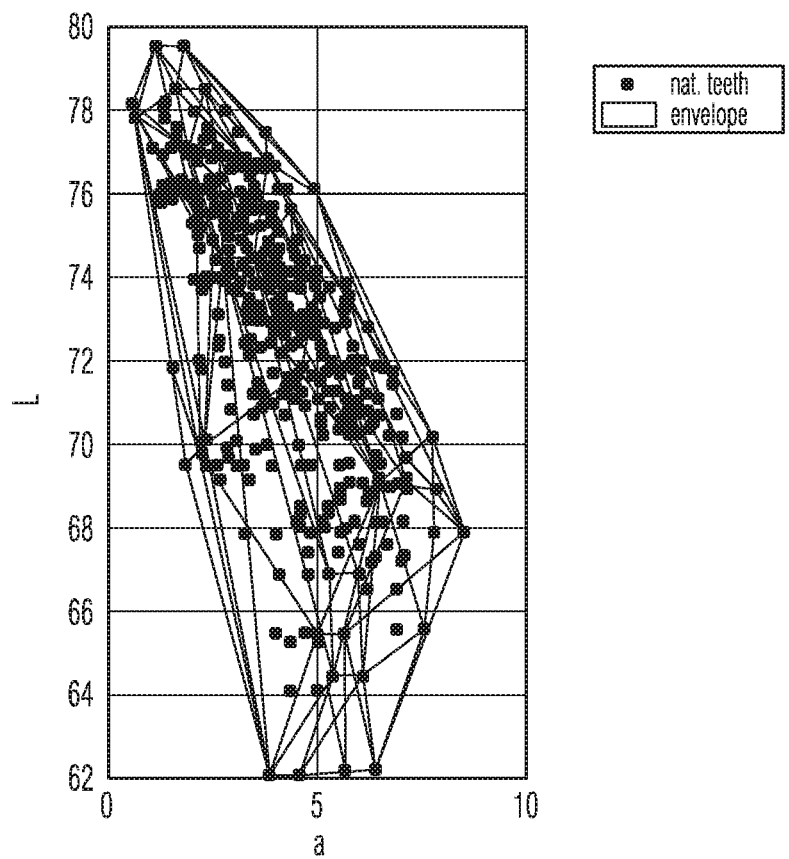
FIG. 1c shows a two-dimensional depiction of the color values of the natural teeth measured, within a three-dimensional color space, as well as the envelope around the points.
Figure 1D:
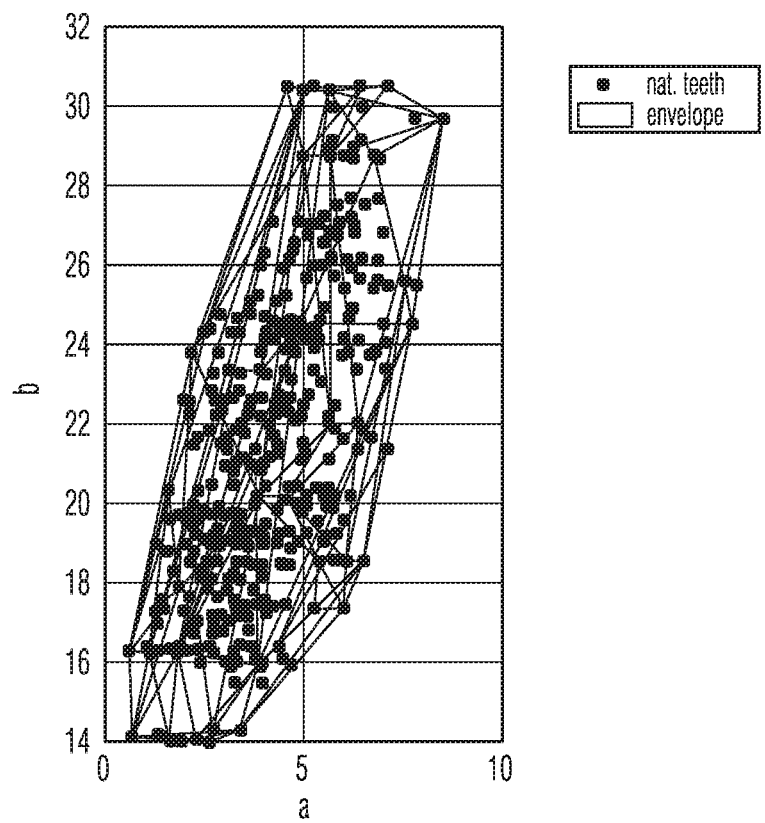
FIG. 1d shows a two-dimensional depiction of the color values of the natural teeth measured, within a three-dimensional color space, as well as the envelope around the points.

In FIGS. 1b, 1c, and 1d, points 12 and envelope 16 are also depicted to be two dimensional; in FIG. 1b, in a three-dimensional perspective with b in the X direction, a in the Z direction, and L in the Y direction.

In FIG. 1c, the same cloud of points is plotted in dimension L over a, and in FIG. 1d in dimension b over a.

It can be taken from the distribution that with values L<=68, b=20 through 25, and a=4 through 6, there are only a few points, but there still are points after all, whereas, for example at these L values and B values, no points could be measured at a<=3 or a=>7. On the other hand, tooth color C4 is situated approximately at a=2, b=24, and L=62, i.e. outside the values actually measured, within the random sample taken out of 368 natural teeth.

This virtually results in the claim that tooth color C4 does not appear among the natural teeth measured, and therefore is not relevant as a target tooth color.

As can be seen, the color values each measured at the margins of envelope 16 are virtually corner points of the three-dimensional envelope. For instance, point 18 is taken as an example here. It is connected by schematic lines with neighboring points, which also extend on envelope 16. In this respect, envelope 16 is depicted as a polyhedron, although it is mathematically built by convex outer surfaces, wherein the envelope is occupied by points similar to point 18.

Figure 2:
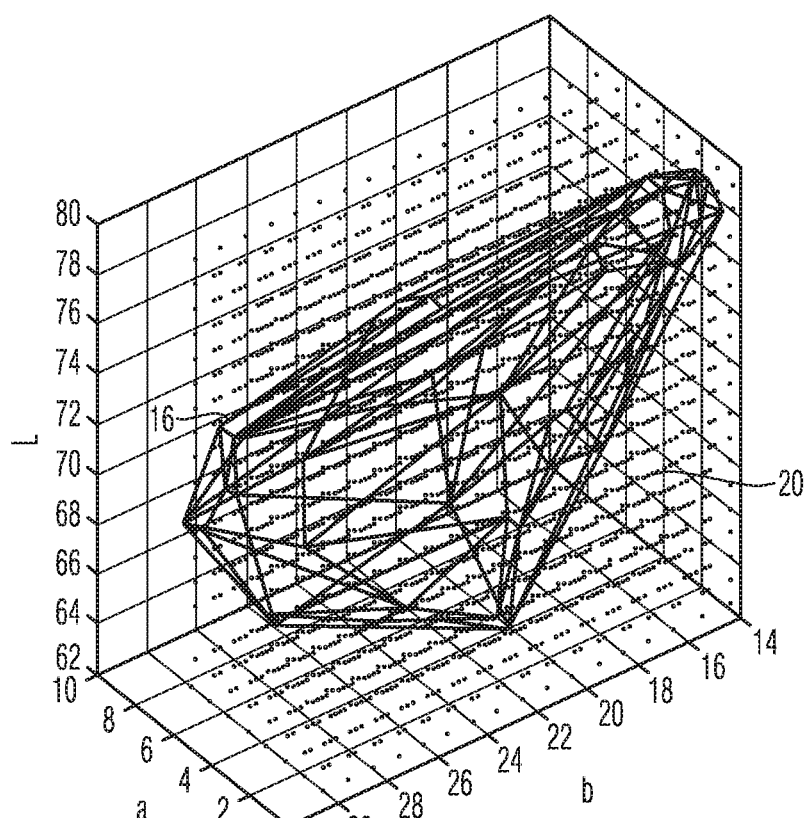
FIG. 2 shows a schematic depiction of the uniformly distributed auxiliary points within the envelope according to FIGS. 1a to 1d and outside said.

From FIG. 2, it is visible how a three-dimensional raster or grid of auxiliary points 20 is arranged over the relevant color space. The auxiliary points extend both within and outside envelope 16, wherein in practice, those points extending outside are deleted or mathematically suppressed.

Figure 3:
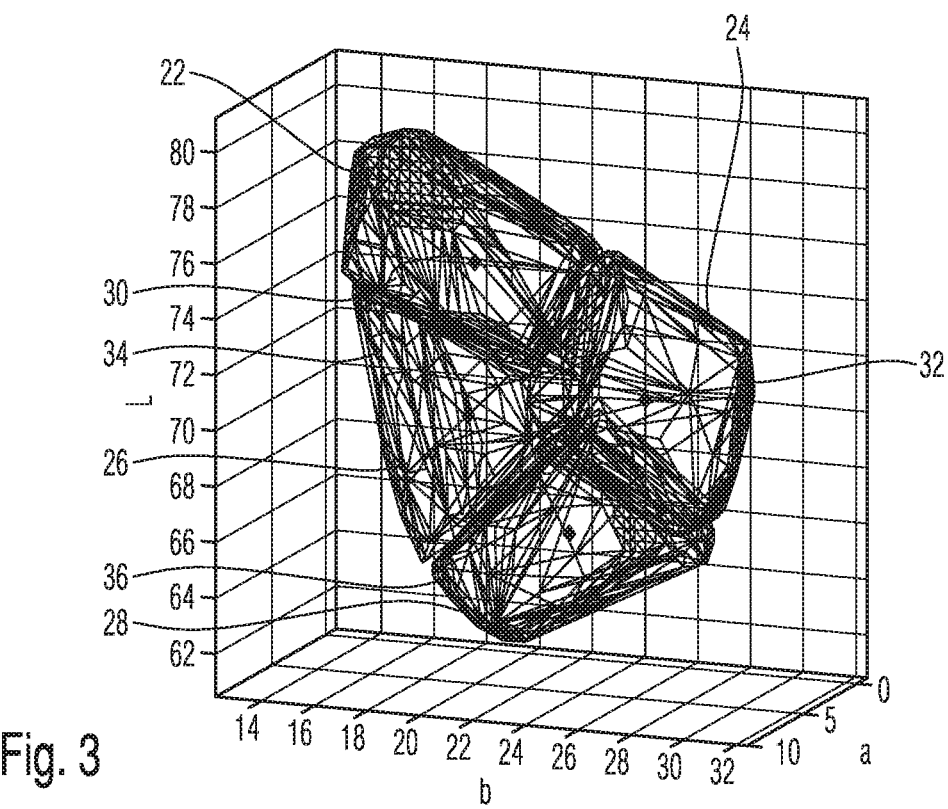
FIG. 3 shows the result of the iteration for determining the four color clouds adjacent to one another for determining the tooth color.

With the help of a more structured process, in particular the K Nearest Neighbour Algorithm, after determining four random initial points, color clouds 22, 24, 26, and 28 are now formed, which are visible from FIG. 3, based on the auxiliary points 20, in which color clouds, all points 12 in accordance with FIG. 1 are situated.

These four color clouds 22 to 28 correspond to the four categories. The geometrical center, 30, 32, 34, and 36, of each color cloud corresponds to the target tooth color. The result is that within the determined color space, i.e., within the cloud 10, there is no greater color distance between the respective neighboring center 30 to 36 and any tooth color than a predetermined threshold value, which, in the exemplary case was determined to be Delta E=5.8.

Concrete Exemplary Calculation

Step 1

Figure 4:
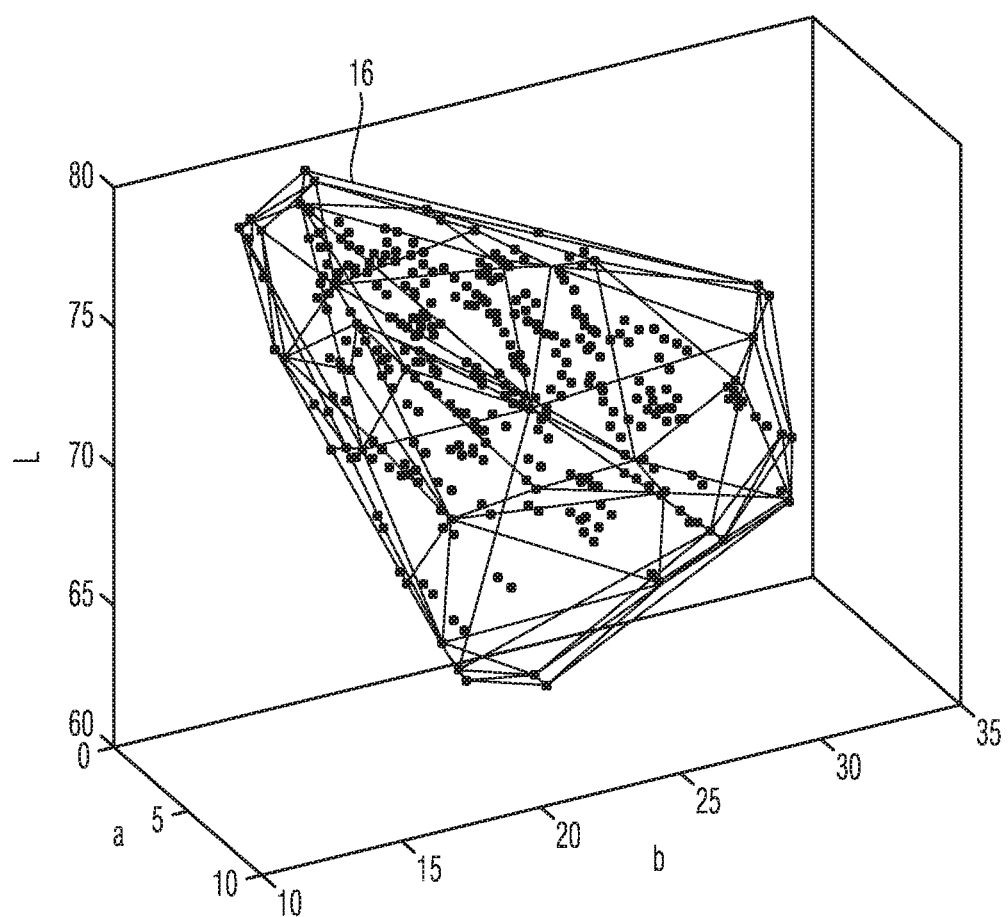
FIG. 4 shows a depiction of the color space measured belonging to step 1 of the exemplary calculation.

As is visible from FIG. 4, a large number of points are plotted in the three-dimensional Lab color space. These correspond to the tooth colors of the natural teeth measured. These define the tooth color space, cf. FIGS. 1a and 1 b.

The blue areas around them form envelope 16 around these red points.

Step 2

From these red dots or points, 4 are randomly selected and are defined as the category values. The number of category values is k, i.e. here k=4.

Figure 5:
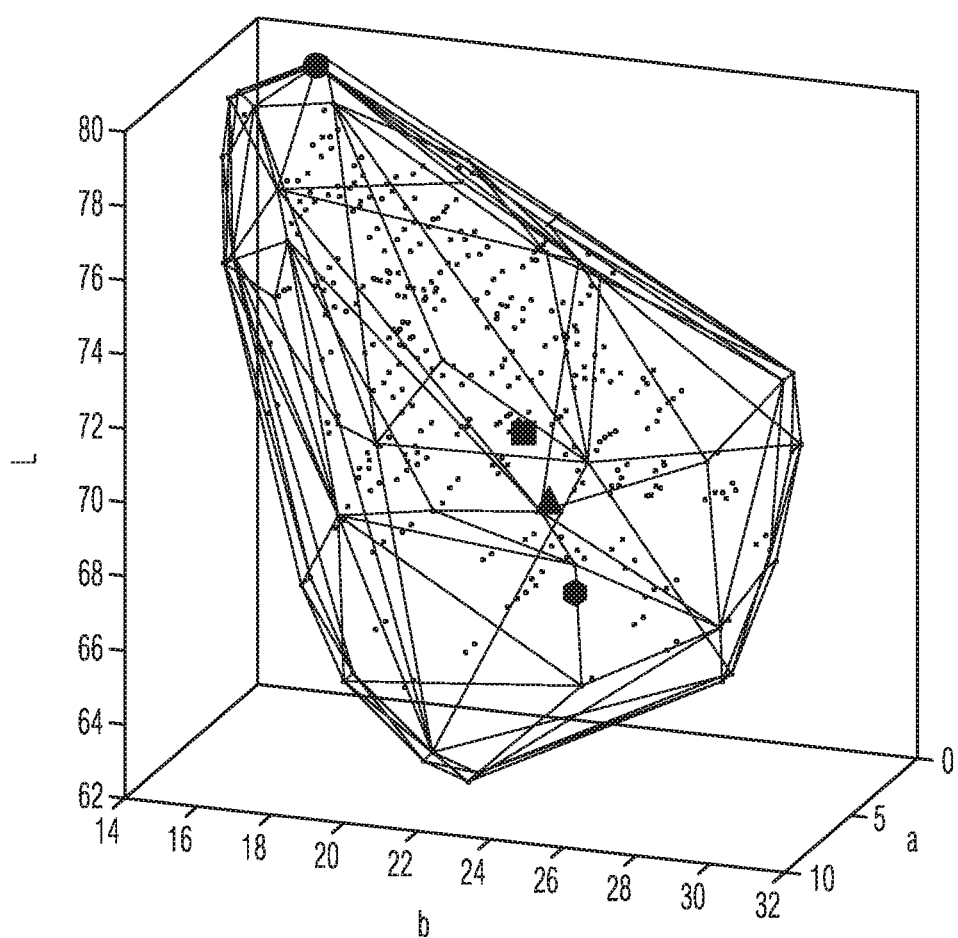
FIG. 5 shows a depiction of selected points of the color space belonging to step 2 of the exemplary calculation.

This is shown in FIG. 5.

In the present case, these have the following Lab values:

|        | L    | a   | b    |
|--------|------|-----|------|
| Cat. 1 | 79.5 | 1.8 | 16.3 |
| Cat. 2 | 70.9 | 3.6 | 22.6 |
| Cat. 3 | 70.2 | 7.0 | 24.5 |
| Cat. 4 | 66.9 | 4.1 | 24.1 |

Step 3

All points are assigned to a category. The assignment is carried out with the help of the color distance to the respective category values. This is why the algorithm is referred to as the "Nearest Neighbor" Algorithm.

Figure 6:
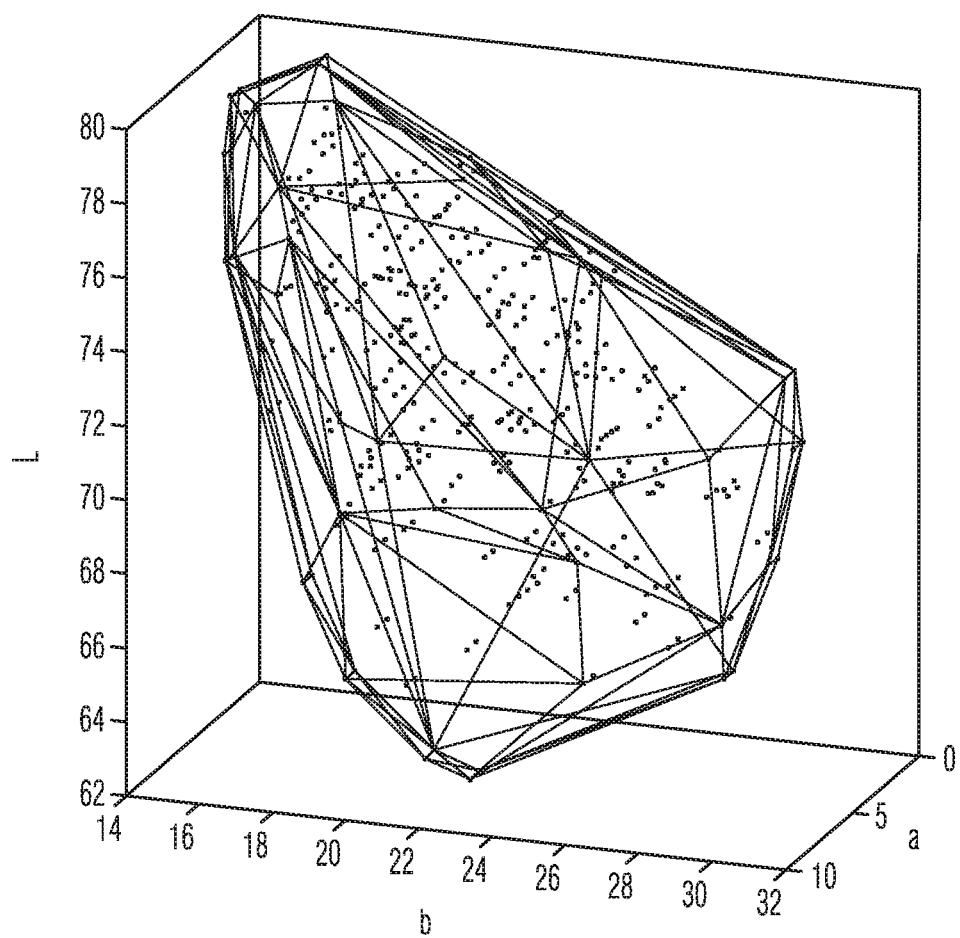
FIG. 6 shows a depiction of selected points of the color space belonging to step 3 of the exemplary calculation.

At the top of FIG. 6, the category probability p(j) is indicated, which is the probability that some points belongs to category j.

At k=4, j may assume the values 1, 2, 3 and 4.

Here: 21% of all points belong to category 1, 51% to category 2, 18% to category 3, and 9% to category 4.

Value E corresponds to entropy. This is highest if all categories have an equal number of points (which is 25% in each). The maximum value of $E/E_{max}$ is therefore 1.

Here, we achieve 0.865.

Step 4

In the smallest and largest categories (here: the pink-colored and light blue points, see FIG. 7), new category values are determined. These are categories 2 and 4.

For the pink category, all pink points are taken, and a new point is randomly determined to be the category value among them. The same happens for light blue.

The category values of green and blue remain unchanged.

|        | L    | a   | b    |
|--------|------|-----|------|
| Cat. 1 | 79.5 | 1.8 | 16.3 |
| Cat. 2 | 75.2 | 2.9 | 24.8 |
| Cat. 3 | 70.2 | 7.0 | 24.5 |
| Cat. 4 | 65.5 | 5.7 | 28.8 |

Step 4a

Figure 8:
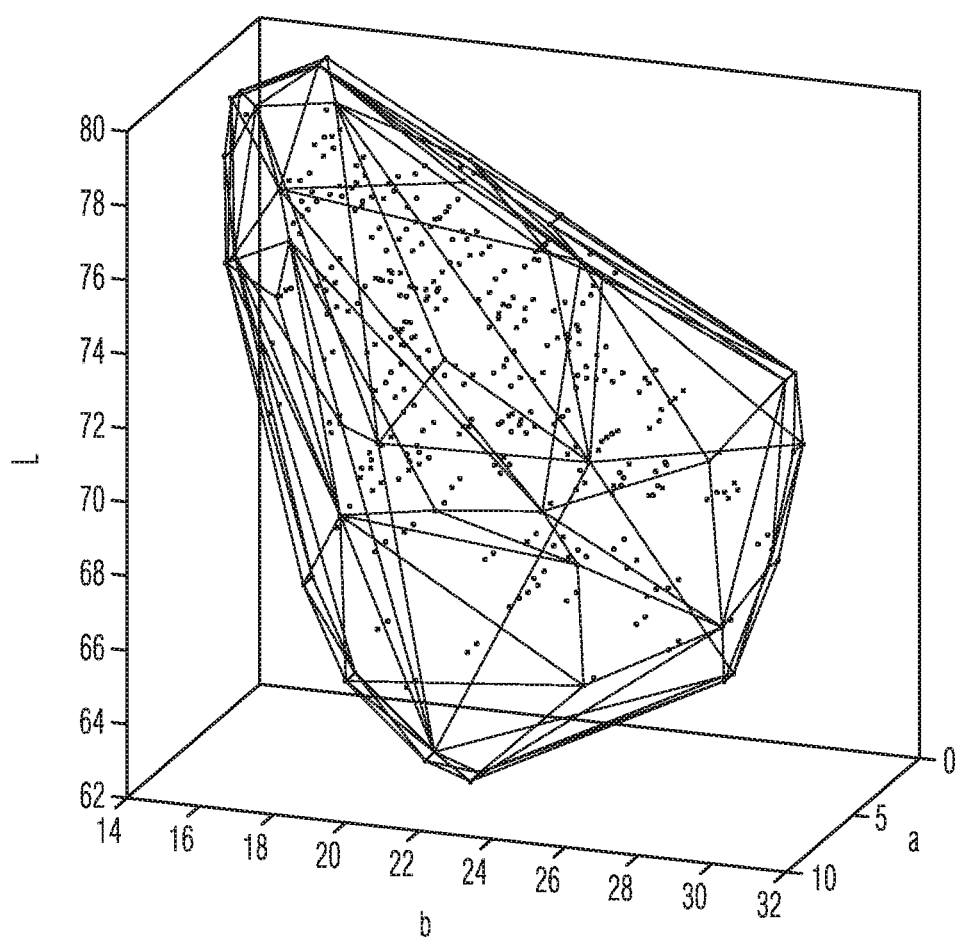
FIG. 8 shows a depiction of selected points of the color space belonging to step 4a of the exemplary calculation.

For all points, the assignment is again determined with the help of the color distance to the category values, according to FIG. 8.

New probabilities result, and thus a new entropy, as is recorded on top in FIG. 8.

Step 5

Figure 9A:
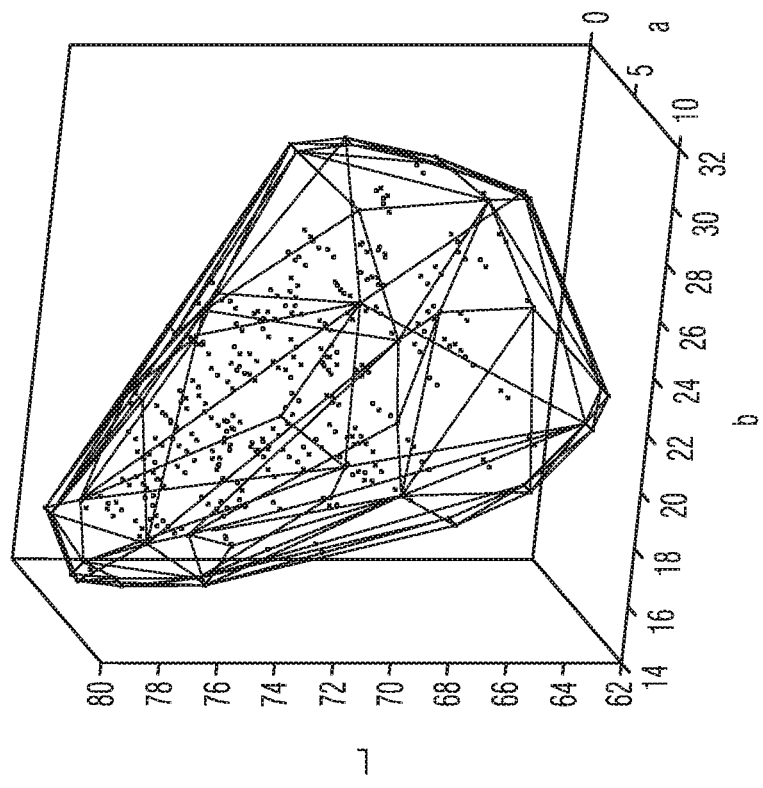
FIG. 9a shows a depiction of selected points of the color space belonging to step 5 of the exemplary calculation.
Figure 9A:
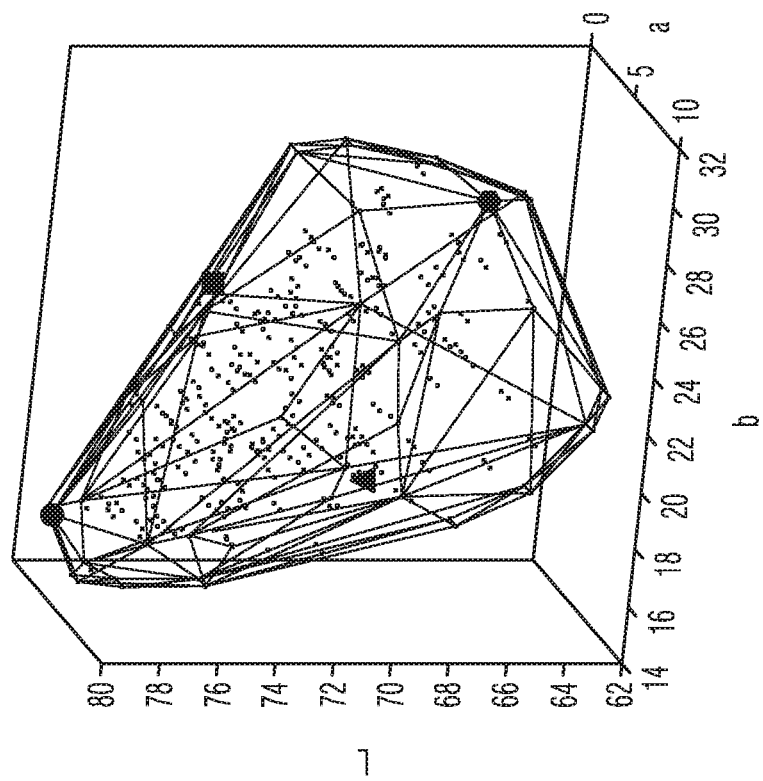

Now, the entire process is repeated all over again and again, see first FIG. 9a. Categories 3 and 4 were those with the extreme values of probabilities here, such that these were determined anew.

The Lab values are recorded on the upper left in FIG. 9a, and the probabilities p(j) and entropy E on the upper right.

Step 6

Figure 9B:
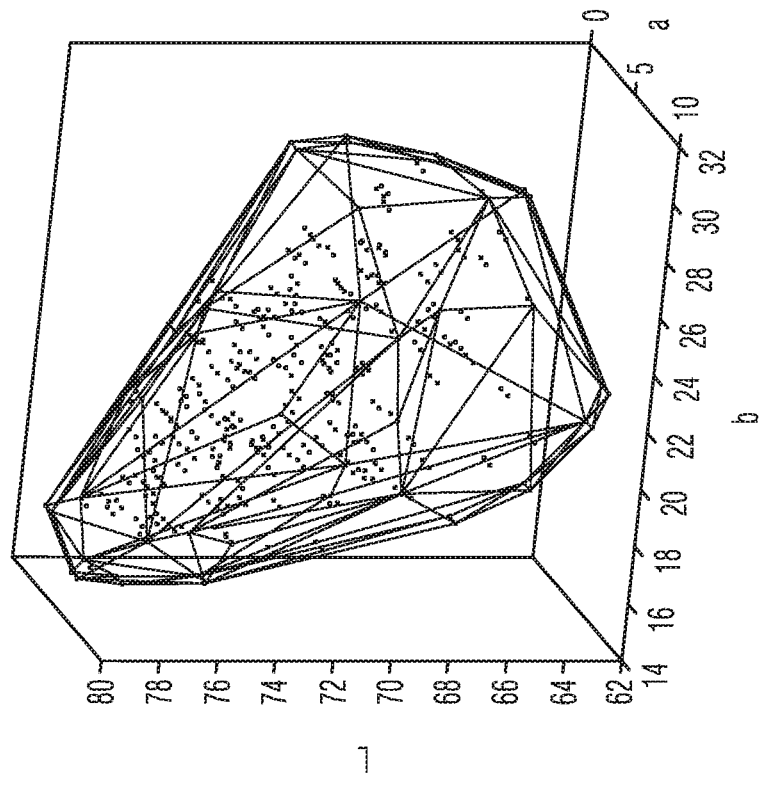
FIG. 9b shows a depiction of selected points of the color space belonging to step 6 of the exemplary calculation.
Figure 9B:
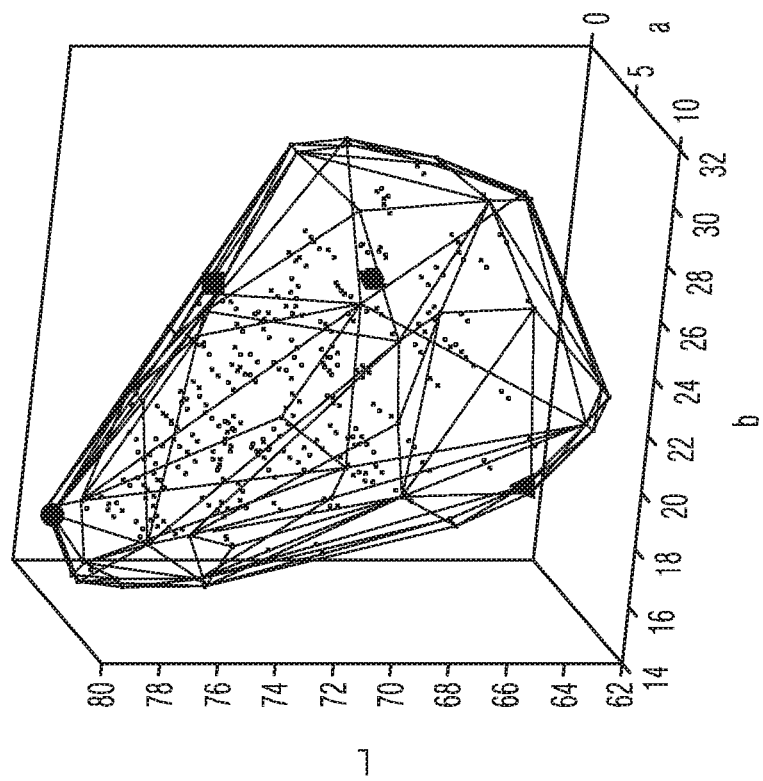

The next iteration step can be taken from FIG. 9b.

Step 7

Figure 9C:
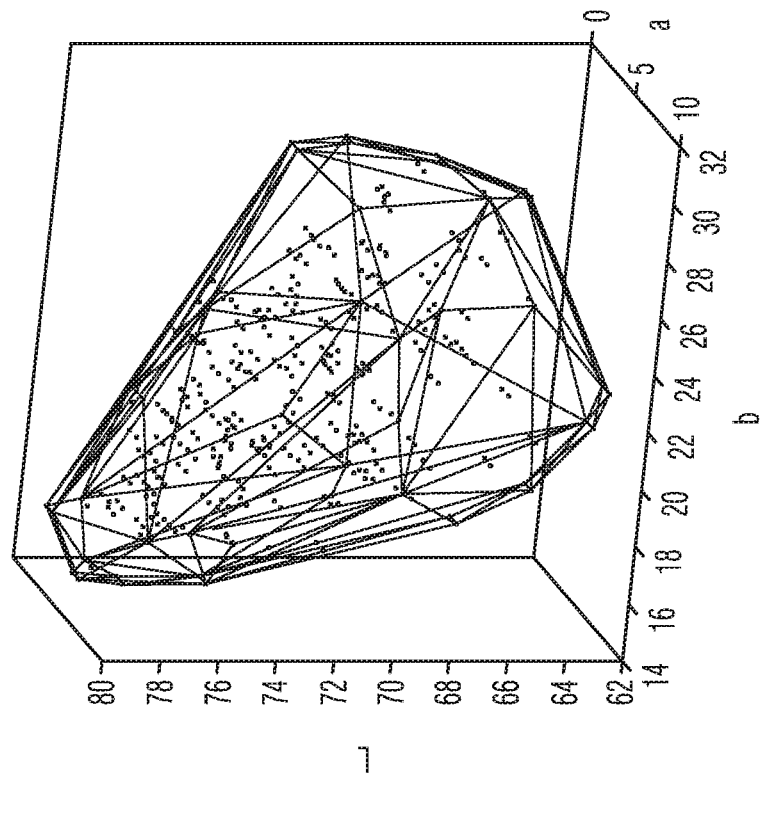
FIG. 9c shows a depiction of selected points of the color space belonging to step 7 of the exemplary calculation.
Figure 9C:
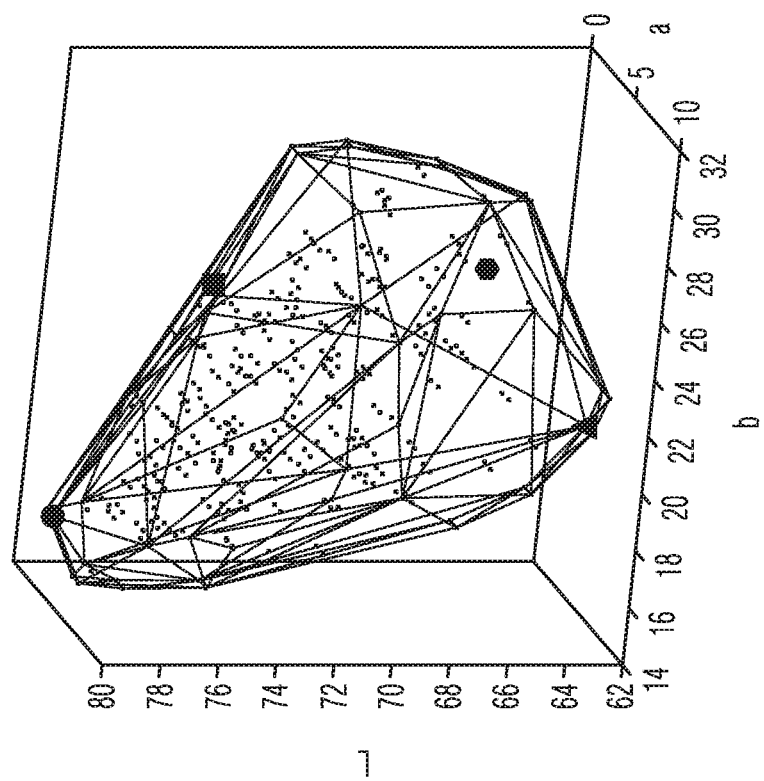

The next iteration step can be taken from FIG. 9c.

Step 8

Figure 9D:
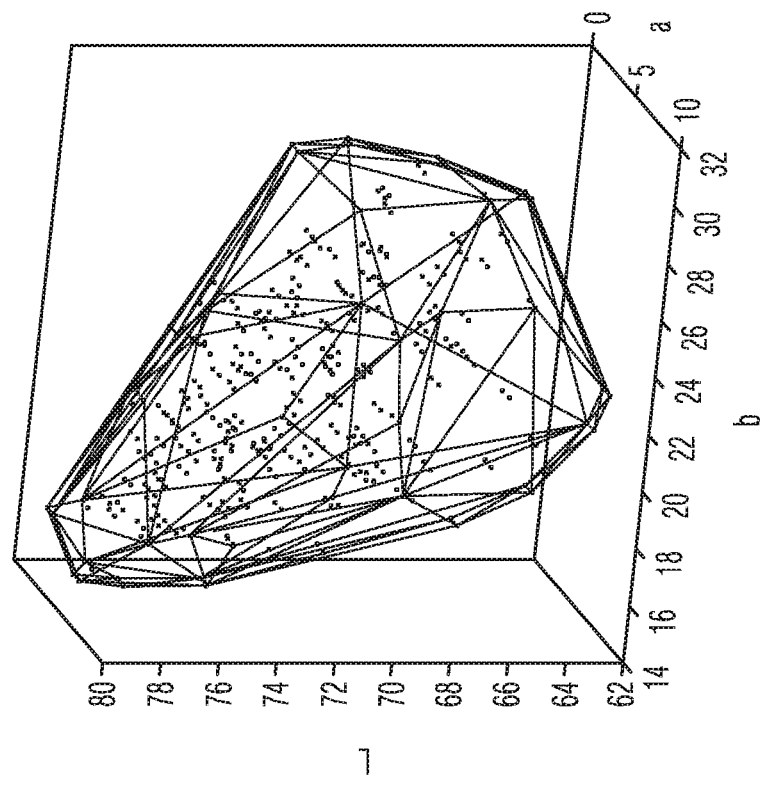
FIG. 9d shows a depiction of selected points of the color space belonging to step 8 of the exemplary calculation.
Figure 9D:
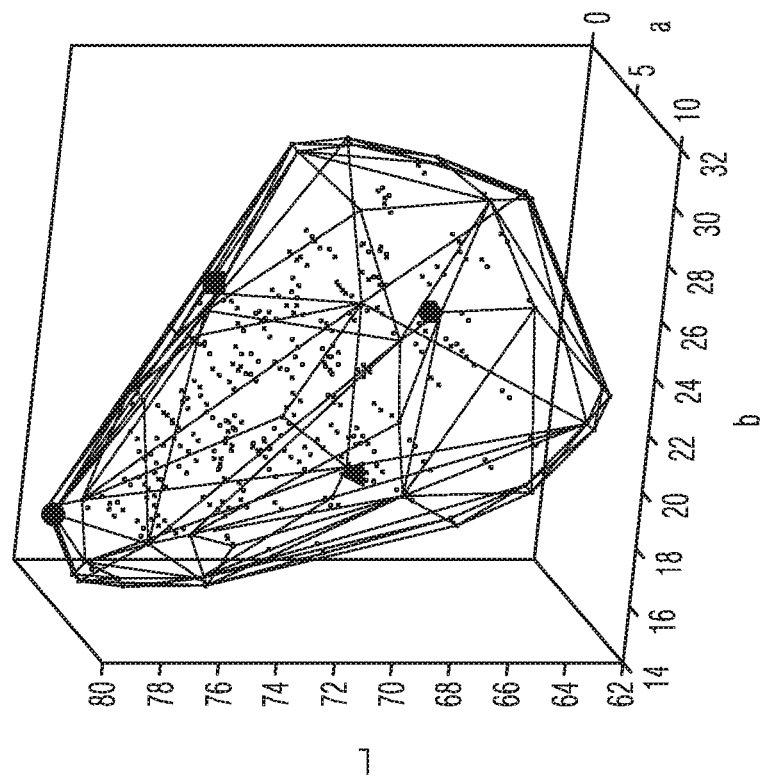

The next iteration step can be taken from FIG. 9d.

Step 9

Figure 9E:
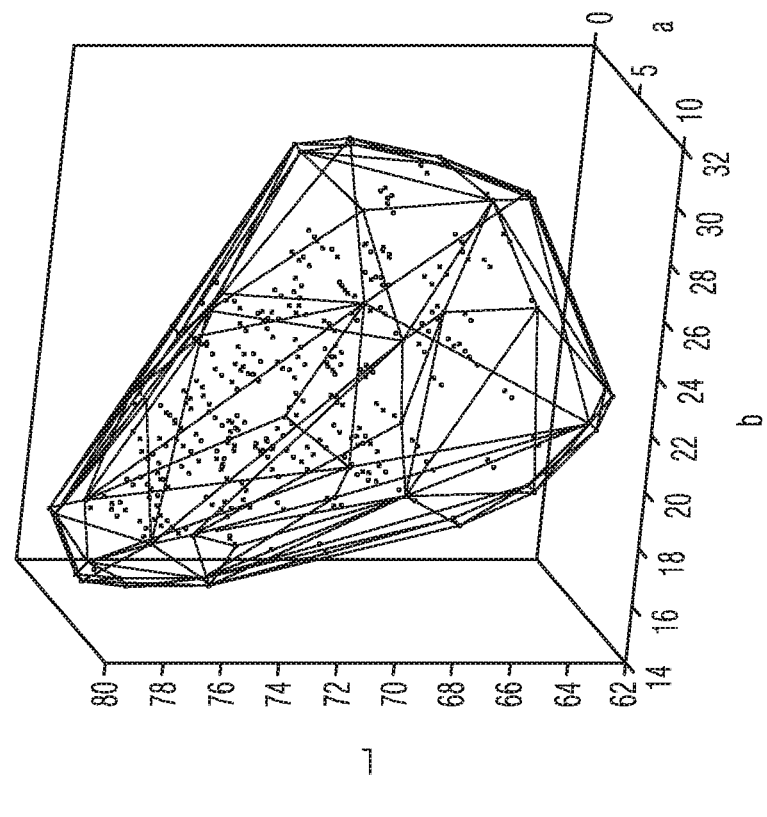
FIG. 9e shows a depiction of selected points of the color space belonging to step 9 of the exemplary calculation.
Figure 9E:
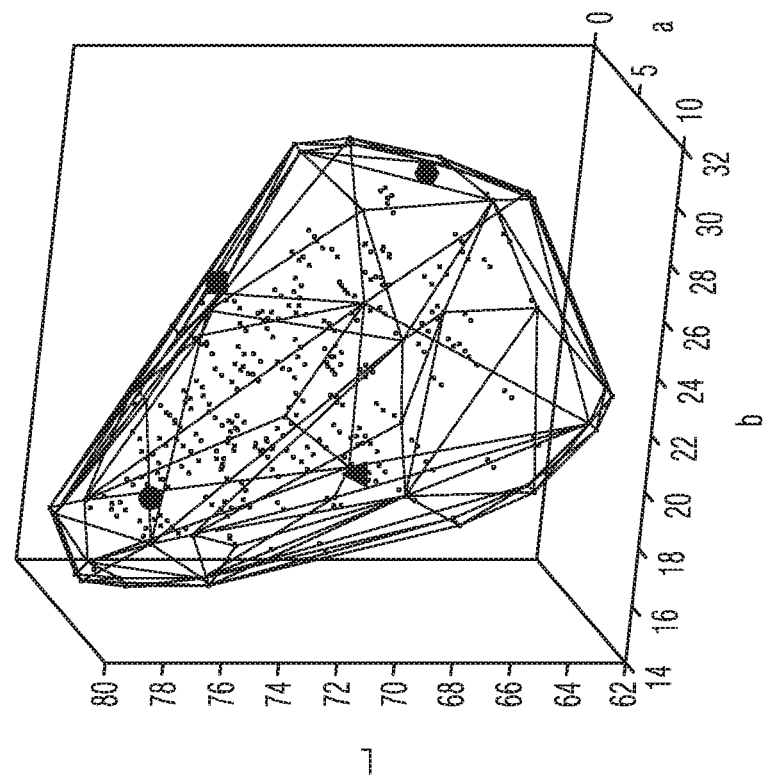

The next iteration step can be taken from FIG. 9e.

Step 10

Figure 9F:
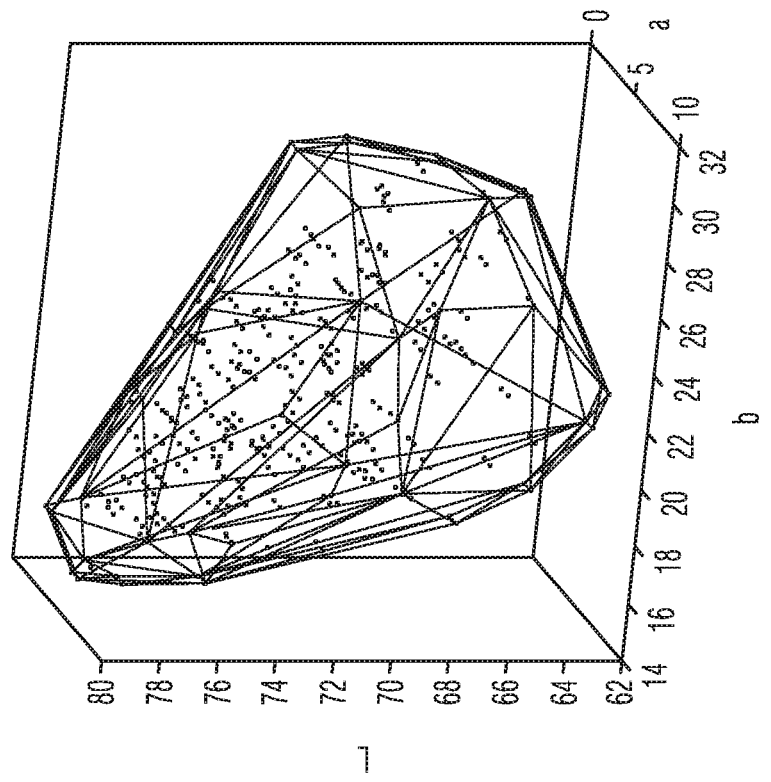
FIG. 9f shows a depiction of selected points of the color space belonging to step 10 of the exemplary calculation.
Figure 9F:
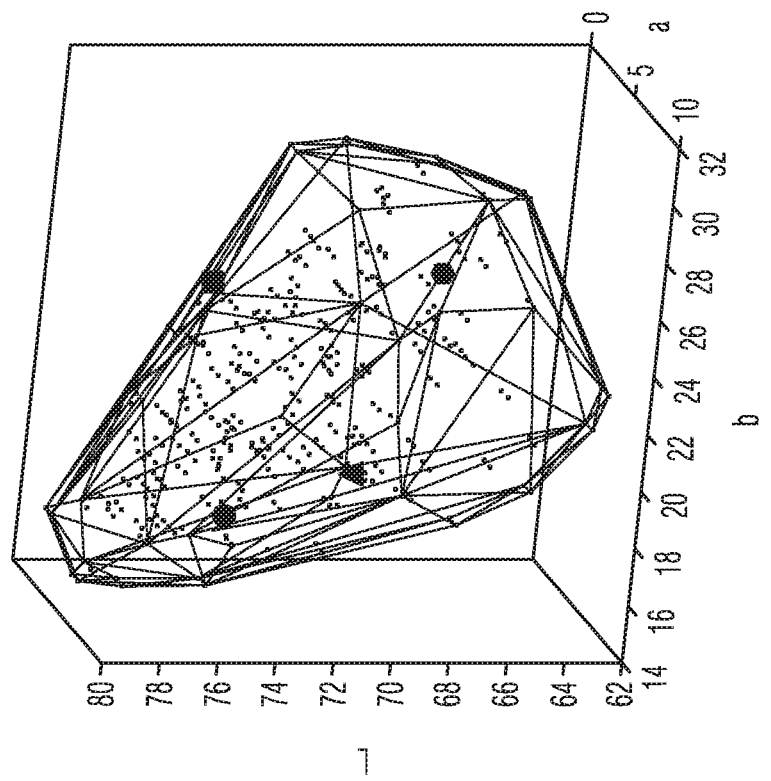

The next iteration step can be taken from FIG. 9f.

Step 11

Figure 9G:
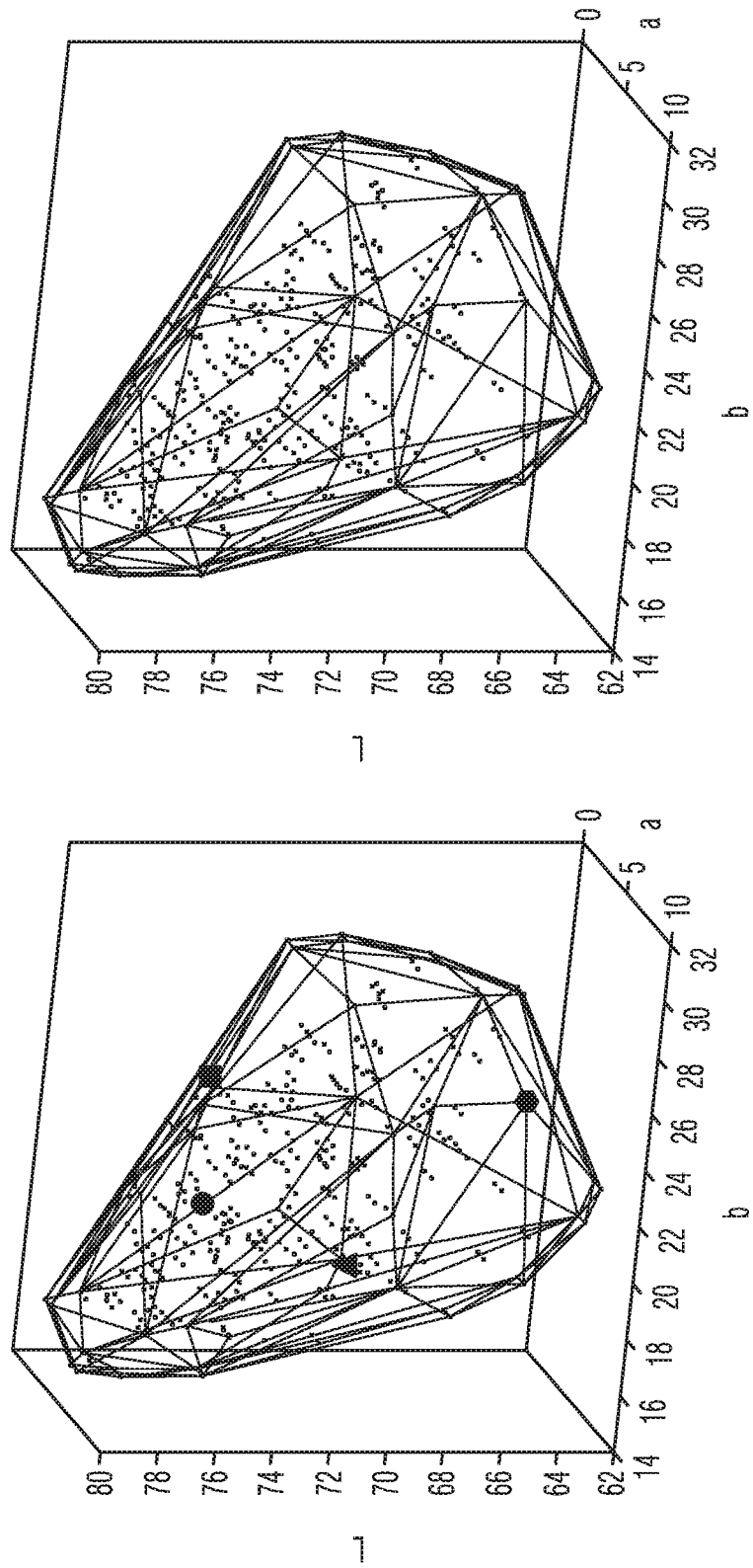
FIG. 9g shows a depiction of selected points of the color space belonging to step 11 of the exemplary calculation.

The next iteration step can be taken from FIG. 9g. Etc.

Step 50,000

Figure 10:
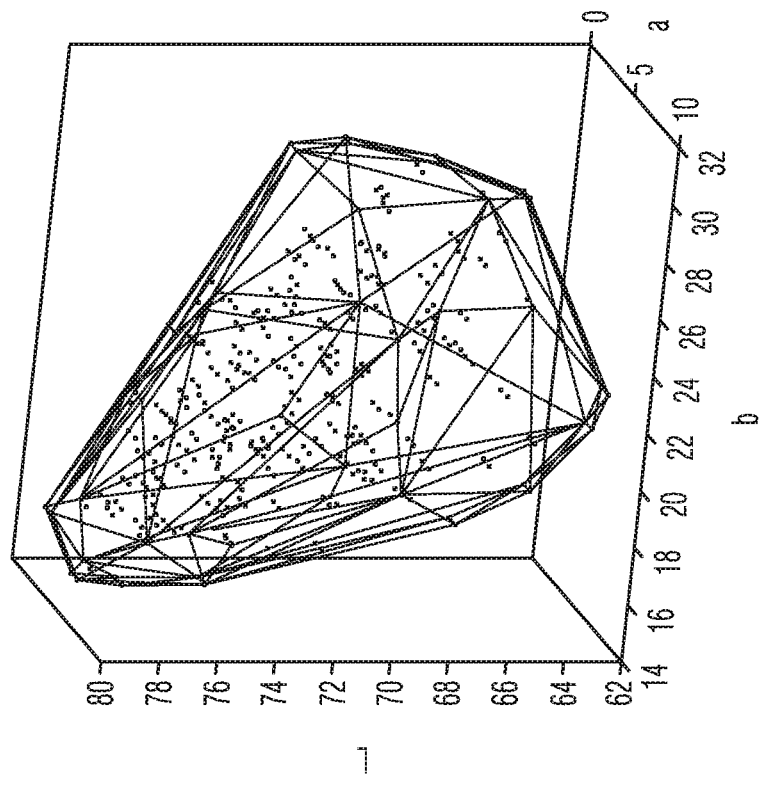
FIG. 10 shows a depiction of selected points of the color space belonging to step 50,000 of the exemplary calculation.
Figure 10:
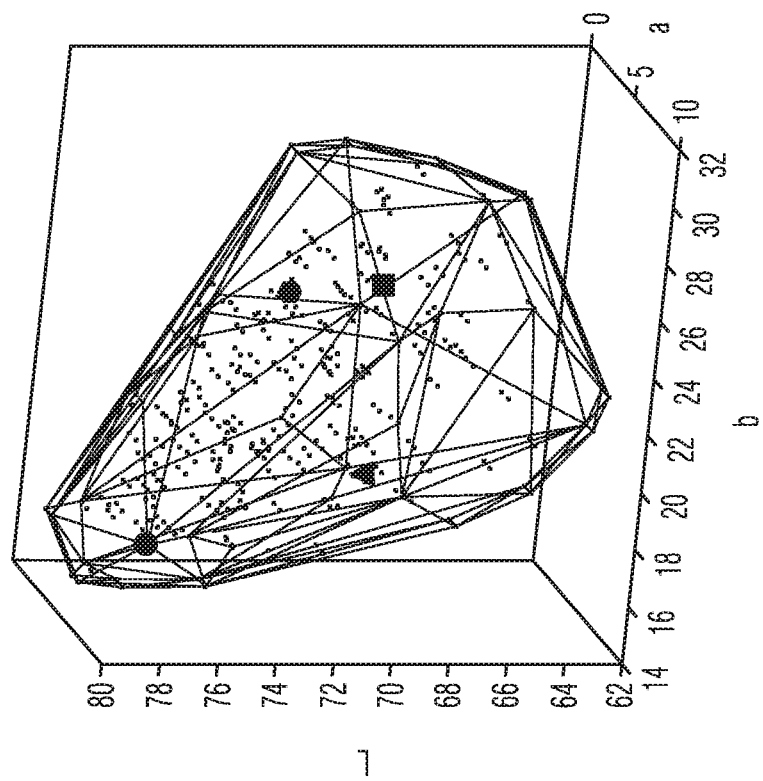

The 50,000th iteration step can be taken from FIG. 10.

The following Lab values result:

|       | L    | a   | b    |
|-------|------|-----|------|
| Cat. 1 | 76.8 | 3.8 | 15.9 |
| Cat. 2 | 70.3 | 5.8 | 25.8 |
| Cat. 3 | 69.5 | 3.9 | 18.4 |
| Cat. 4 | 72.4 | 2.6 | 24.4 |

Step 50,001

The average value of all points within the respective category is taken. These form the Lab values for the process in accordance with the invention.

Step 50,002

This example shows an iteration handling.

In an advantageous embodiment, the algorithm is carried out several times, and the best result (the one with the highest entropy, or with an equal number of points within each category) is used as the best final result.

Finally, there will result the values below:

|       | L    | a   | b    |
|-------|------|-----|------|
| Cat. 1 | 75.8 | 2.7 | 17.2 |
| Cat. 2 | 74.2 | 3.8 | 22.7 |
| Cat. 3 | 69.9 | 5.8 | 26.2 |
| Cat. 4 | 70.0 | 4.3 | 19.5 |

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. Other programming paradigms can be used, e.g., functional programming, logical programming, or other programming. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to programmable processor.

To provide for interaction with a user, the systems and techniques described here can be implemented on a computer having a display device (e.g., an LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation.

Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

In some embodiments, the system may include a camera, a processor, an electronic data storage unit, and a display. The camera can be a standard camera, an infrared dot-projection detector, flood illuminator camera, structured-light three-dimensional scanner, standard infrared detector, ultrasonic imaging device, Doppler detector, or any other suitable visualization system capable of capturing information related to a patient's dentition. The processor can be a single processor having one or more cores, or a plurality of processors connected by a bus, network, or other data link. The electronic data storage unit can be any form of non-transitory computer-readable storage medium suitable for storing the data produced by the system. The display can be any display suitable for displaying a digital color or grayscale image.

In some embodiments, the camera, processor, electronic data storage unit, and digital display are components of a single device. The single device may be a smartphone, tablet, laptop computer, personal digital assistant, or other computing device.

In some embodiments, the processor is in communication over a network, which could be wired or wireless, with an external processor used for performing one or more calculation steps and/or a network-attached electronic data storage unit.

In some embodiments, the present disclosure makes use of cloud computing to perform one or more calculations steps remotely and/or remote storage to enable the storage of data remotely for collaborative or remote analysis.

In some embodiments, the system comprises a plurality of graphical user interfaces to permit multiple users to view or analyze the same data.

In some embodiments, the system operates by capturing information related to a patient's dentition using a camera, creating a model of the patient's dentition on a processor, fitting a model of a proposed post-alteration dentition to the patient's dentition on the processor, coloring the model of the proposed post-alteration dentition to match an expected real post-alteration coloration, and displaying the fitted model of the proposed post-alteration dentition in place of the patient's actual dentition on a display which otherwise shows the patient's actual facial features. The information related to a patient's dentition, the model of the patient's dentition, and the model of the proposed post-alteration dentition may be stored on an electronic data storage unit.

In some embodiments, the operations are performed in real-time.

In some embodiments, a user interface is configured such that a user may view the "before" dentition image and the "after" dentition image simultaneously either side-by-side or with a full or partial overlay.

Where used herein, the term "non-transitory" is a limitation on the computer-readable storage medium itself—that is, it is tangible and not a signal—as opposed to a limitation on the persistence of data storage. A non-transitory computer-readable storage medium does not necessarily store information permanently. Random access memory (which may be volatile, non-volatile, dynamic, static, etc.), read-only memory, flash memory, memory caches, or any other tangible, computer-readable storage medium, whether synchronous or asynchronous, embodies it.

"Computer" is not limited to physical desktop computers. Such computers may include virtual machines running on local or remote servers. The computing power may be increased by combining or bridging at least two or a plurality of such machines, if required.

Also, any kind of mobile devices, such as notebooks, laptops, tablets and smartphone may be used as computers. Such computers usually comprise all or at least several of the components mentioned above.

It is also possible to use a local computer having access to a local or remote database, and any of the above mentioned mobile devices having access to the same database, intended to share tasks between local and mobile devices.

Although the invention is illustrated above, partly with reference to some preferred embodiments, it must be understood that numerous modifications and combinations of different features of the embodiments can be made. All of these modifications lie within the scope of the appended claims.

The invention claimed is:

1. A process for determining a tooth color of a filling or restoration comprising
   electronically recording a color value of at least one tooth,
   wherein natural teeth are spectrally measured in advance or in a first step to determine color values of the natural teeth,
   wherein the measured color values of the natural teeth are classified into several categories within a color space,
   wherein each of the several categories form a three-dimensional color cloud within the color space, which is performed with a structure-recognizing algorithm, and
   wherein the tooth color of the filling or restoration is determined by evaluating to which of the several categories the recorded color value has the smallest color distance, or to which color cloud the recorded color value belongs.

2. The process according to claim 1,
   wherein the filling or restoration is produced using composite materials,
   wherein the at least one tooth is are scanned to determine the color value, and
   wherein the several categories comprise four categories.

3. The process according to claim 1,
   wherein the determined tooth color is used for the filling or the restoration.

4. The process according to claim 1,
   wherein the natural teeth are selected from a multitude of at least 20 different existing natural teeth, independently of the restoration or filling to be color-matched.

5. The process according to claim 1,
   wherein based on the spectral measurement, one point within the color space is determined for each of the natural teeth, and
   wherein, based on the points determined for each of the natural teeth measured, a convex envelope is determined within the color space, to which the color value points of all of the natural teeth measured belong.

6. The process according to claim 5,
   wherein a structure, a grid or a mesh, made up of uniformly distributed points is placed over the color space, and, based on initial categories, evaluating which initial category is closest to some O point or initial point, category boundaries between individual categories are iteratively determined as surfaces extending in a three-dimensional fashion.

7. The process according to claim 1,
   wherein the classification into categories is performed based on the largest number of neighboring points,
   wherein each category corresponds to one natural tooth.

8. The process according to claim 7,
   wherein a Euclidian distance is used as the measurement of the color distance.

9. The process according to claim 1,
   wherein the algorithm is a Nearest Neighbour Algorithm or one symmetry-recognition algorithm.

10. The process according to claim 1,
wherein, for determining the categories, random initial categories are first selected,
wherein entropy of categorisation is calculated as a measurement of quality over the entire color space, and
wherein, with the help of the Nearest Neighbour Algorithm comprising a K Nearest Neighbour Algorithm, and pre-determining the number of categories, optimum category boundaries are iteratively determined.

11. The process according to claim 10,
wherein the number of categories is first determined to be a specific value by way of trial, and
wherein a maximum permissible color distance value is determined, and
wherein the number of categories is increased if the color distance value is exceeded in the worst case.

12. The process according to claim 11,
wherein the specific value comprises 4, and
wherein the maximum permissible color distance value comprises E=5.8.

13. The process according to claim 11,
wherein the specific value comprises 4,
wherein a second maximum permissible color distance value is determined, and
wherein the number of categories is reduced if the color distance value is undercut in a worst case.

14. The process according to claim 13,
wherein the second maximum permissible color distance value comprises E=3.

15. A process for determining a tooth color of a filling, an inlay or an onlay which is produced using composite materials comprising
scanning with a scanning device or manually visually detecting at least one tooth,
spectrally measuring with a spectrophotometer, in advance, natural teeth to provide color values within a color space classified into several categories which each form a color space extending in a three-dimensional fashion within the color space, which is done with a structure-recognizing algorithm, and
determining, manually or by comparison to a scan, the tooth color of the filling, inlay or onlay by evaluating to which center of the color cloud of one of the categories the tooth has the slightest color distance,
wherein the color value centers were determined in advance.

16. The process according to claim 15,
wherein the several categories comprise four categories.

17. The process according to claim 15,
wherein four color clouds are formed corresponding to the categories, and
wherein the centers of each of the four color clouds are situated at the following position:

|   | L | a | b |
|---|---|---|---|
| 1. | 75.8 | 2.7 | 17.2 |
| 2. | 74.2 | 3.8 | 22.7 |
| 3. | 69.9 | 5.8 | 26.2 |
| 4. | 70.0 | 4.3 | 19.5, | wherein there may be uncertainty areas with the following color distances extending around the centres, within which the centres may also be situated:

Delta $L=+/-2$, delta $a=+/-1$, delta $b=+/-2$.

18. An apparatus comprising
at least one processor,
a memory operatively coupled to the at least one processor and storing computer readable instructions, that when executed cause the apparatus to:
receive measured color values from a plurality of natural teeth, classify the color values of the plurality of measured teeth into several categories within a color space,
wherein each of the several categories form a three-dimensional color cloud within the color space using a structure-recognizing algorithm,
wherein the several categories provide a set of color values for a set of tooth coloring materials.

19. The apparatus according to claim 18, further comprising
a connection to a spectrophotometer.

20. A computer implemented method comprising computer program code which is stored on a machine-readable medium, the machine-readable medium comprising computer instructions executable by a processor to perform a method for determining color values of dental materials comprising;
with a spectrophotometer, spectrally measuring a plurality of natural teeth to determine color values of the natural teeth,
with the processor, classifying the measured color values of the natural teeth into several categories within a color space,
wherein each of the several categories form a three-dimensional color cloud within the color space, and
wherein the several categories provide a set of color values for a set of dental materials or tooth coloring materials.

21. The computer implemented method according to claim 20,
wherein the forming of the three-dimensional color cloud is done with a structure-recognizing algorithm.

22. The computer implemented method according to claim 20, further comprising
determining which dental material or tooth coloring material most closely matches a patient's tooth for which a dental restoration is being made.

23. A set of dental materials comprising
a set of different colored dental materials having color values determined using the method of
spectrally measuring a plurality of natural teeth to determine color values of the natural teeth,
classifying the measured color values of the natural teeth into several categories within a color space,
wherein each of the several categories form a three-dimensional color cloud within the color space, and
wherein the several categories provide a set of color values for the set of different colored dental materials.

* * * * *